(12) United States Patent
Bell et al.

(10) Patent No.: US 12,200,132 B1
(45) Date of Patent: Jan. 14, 2025

(54) SECURE MULTI-VERIFICATION OF BIOMETRIC DATA IN A DISTRIBUTED COMPUTING ENVIRONMENT

(71) Applicant: Wells Fargo Bank, N.A., San Francisco, CA (US)

(72) Inventors: Thomas E. Bell, San Francisco, CA (US); Peter Bordow, Fountain Hills, AZ (US); Julio Jiron, San Bruno, CA (US); Akhlaq M. Khan, San Francisco, CA (US); Volkmar Scharf-Katz, San Francisco, CA (US); Jeff J. Stapleton, Arlington, TX (US); Richard Orlando Toohey, San Francisco, CA (US); Ramesh Yarlagadda, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 240 days.

(21) Appl. No.: 17/895,469

(22) Filed: Aug. 25, 2022

(51) Int. Cl.
*H04L 9/32* (2006.01)

(52) U.S. Cl.
CPC .......... *H04L 9/3231* (2013.01); *H04L 9/3213* (2013.01)

(58) Field of Classification Search
CPC ............................ H04L 9/3231; H04L 9/3213
See application file for complete search history.

(56) References Cited

U.S. PATENT DOCUMENTS

| 7,133,846 | B1 | 11/2006 | Ginter et al. |
| 7,673,797 | B2 | 3/2010 | Edwards |
| 8,234,387 | B2 | 7/2012 | Bradley et al. |
| 8,446,275 | B2 | 5/2013 | Utter, II |
| 8,731,977 | B1 | 5/2014 | Hardin et al. |
| 8,756,153 | B1 | 6/2014 | Rolf |

(Continued)

FOREIGN PATENT DOCUMENTS

| CA | 2478548 C | 3/2014 |
| DE | 10 2021 108 925 A1 | 10/2022 |

(Continued)

OTHER PUBLICATIONS

Jain, et al., A Blockchain-Based distributed network for Secure Credit Scoring, 2019 5th International Conference on Signal Processing, Computing and Control (ISPCC), 306-12, Oct. 2019; ISBN-13: 978-1-7281-3988-3.

(Continued)

*Primary Examiner* — Piotr Poltorak
*Assistant Examiner* — Brian William Avery
(74) *Attorney, Agent, or Firm* — Foley & Lardner LLP

(57) ABSTRACT

Disclosed are example methods, systems, and devices that allow for secure multi-verification of biometric data in a distributed computing environment. The techniques include receiving a request to grant authorization to a second user. The request can include biometric data of the first user and second user. An authorization token can be generated based on the request, which can be transmitted to a second computing device of the second user. A second request can be received from a third computing device that includes the authorization token and third biometric data. The second request can be verified based on the authorization token, the third biometric data, and provenance data, and an indication that the grant of authorization to the second user is verified can be transmitted to the first, second, or third computing devices.

20 Claims, 8 Drawing Sheets

(56) References Cited

U.S. PATENT DOCUMENTS

| | | |
|---|---|---|
| 8,831,972 B2 | 9/2014 | Angell et al. |
| 8,965,803 B2 | 2/2015 | Jung et al. |
| 9,087,058 B2 | 7/2015 | Neven et al. |
| 9,094,388 B2 | 7/2015 | Tkachev |
| 9,177,257 B2 | 11/2015 | Kozloski et al. |
| 9,443,298 B2 | 9/2016 | Ross et al. |
| 9,519,783 B2 | 12/2016 | Pruthi et al. |
| 9,558,397 B2 | 1/2017 | Liu et al. |
| 9,734,290 B2 | 8/2017 | Srinivas et al. |
| 9,864,992 B1 | 1/2018 | Robinson et al. |
| 10,024,684 B2 | 7/2018 | Wang |
| 10,044,700 B2 | 8/2018 | Gresham et al. |
| 10,075,445 B2 | 9/2018 | Chen et al. |
| 10,102,491 B2 | 10/2018 | Connolly et al. |
| 10,110,608 B2 | 10/2018 | Dureau |
| 10,127,378 B2 | 11/2018 | Toth |
| 10,142,362 B2 | 11/2018 | Weith et al. |
| 10,181,032 B1 | 1/2019 | Sadaghiani et al. |
| 10,210,527 B2 | 2/2019 | Radocchia |
| 10,313,336 B2 | 6/2019 | Giobbi |
| 10,362,027 B2 | 7/2019 | Eramian et al. |
| 10,387,695 B2 | 8/2019 | Engels et al. |
| 10,505,965 B2 | 12/2019 | Moyle et al. |
| 10,552,596 B2 | 2/2020 | Wang et al. |
| 10,572,778 B1 | 2/2020 | Robinson et al. |
| 10,614,302 B2 | 4/2020 | Withrow |
| 10,664,581 B2 | 5/2020 | Hou et al. |
| 10,740,767 B2 | 8/2020 | Withrow |
| 10,757,097 B2 | 8/2020 | Yocam et al. |
| 10,778,676 B1 | 9/2020 | Griffin et al. |
| 10,834,084 B2 | 11/2020 | Ouellette et al. |
| 10,855,679 B2 | 12/2020 | Rajakumar |
| 10,938,828 B1 | 3/2021 | Badawy et al. |
| 10,943,003 B2 | 3/2021 | Bingham et al. |
| 10,963,670 B2 | 3/2021 | Ross et al. |
| 10,977,353 B2 | 4/2021 | Bender et al. |
| 11,044,267 B2 | 6/2021 | Jakobsson et al. |
| 11,048,794 B1 | 6/2021 | Bordow |
| 11,048,894 B2 | 6/2021 | Feldman |
| 11,055,390 B1 | 7/2021 | Kragh |
| 11,057,366 B2 | 7/2021 | Avetisov et al. |
| 11,068,909 B1 | 7/2021 | Land et al. |
| 11,075,904 B2 | 7/2021 | Jha et al. |
| 11,089,014 B2 | 8/2021 | Buscemi |
| 11,093,789 B2 | 8/2021 | Wang et al. |
| 11,127,092 B2 | 9/2021 | Kurian |
| 11,128,467 B2 | 9/2021 | Chapman et al. |
| 11,151,550 B2 | 10/2021 | Prabhu et al. |
| 11,157,907 B1 | 10/2021 | Kumar |
| 11,163,931 B2 | 11/2021 | Ricci |
| 11,200,306 B1 | 12/2021 | Singh |
| 11,205,011 B2 | 12/2021 | Jakobsson et al. |
| 11,223,646 B2 | 1/2022 | Cunningham et al. |
| 11,327,992 B1 | 5/2022 | Batsakis et al. |
| 11,451,532 B2 | 9/2022 | Arif Khan et al. |
| 11,522,867 B2 | 12/2022 | Han et al. |
| 2003/0086341 A1 | 5/2003 | Wells et al. |
| 2006/0129478 A1 | 6/2006 | Rees |
| 2007/0078908 A1 | 4/2007 | Rohatgi et al. |
| 2008/0120302 A1 | 5/2008 | Thompson |
| 2009/0089107 A1 | 4/2009 | Angell et al. |
| 2009/0089205 A1 | 4/2009 | Bayne |
| 2012/0237908 A1 | 9/2012 | Fitzgerald et al. |
| 2015/0112732 A1 | 4/2015 | Trakru et al. |
| 2015/0220999 A1 | 8/2015 | Thornton et al. |
| 2015/0317728 A1 | 11/2015 | Nguyen |
| 2016/0050557 A1 | 2/2016 | Park et al. |
| 2016/0162882 A1 | 6/2016 | McClung, III |
| 2016/0224773 A1 | 8/2016 | Ramaci |
| 2016/0335629 A1 | 11/2016 | Scott |
| 2017/0012992 A1 | 1/2017 | Doctor et al. |
| 2017/0063831 A1 | 3/2017 | Arnold et al. |
| 2017/0063946 A1 | 3/2017 | Quan et al. |
| 2017/0230351 A1 | 8/2017 | Hallenborg |
| 2017/0236037 A1 | 8/2017 | Rhoads et al. |
| 2018/0205546 A1 | 7/2018 | Haque et al. |
| 2019/0095916 A1 | 3/2019 | Jackson |
| 2019/0149539 A1 | 5/2019 | Scruby |
| 2019/0163889 A1 | 5/2019 | Bouse |
| 2019/0205939 A1 | 7/2019 | Lal et al. |
| 2019/0334724 A1 | 10/2019 | Anton et al. |
| 2020/0211031 A1 | 7/2020 | Patil |
| 2020/0266985 A1 | 8/2020 | Covaci et al. |
| 2020/0311678 A1 | 10/2020 | Fletcher et al. |
| 2020/0374311 A1 | 11/2020 | Madhu et al. |
| 2020/0380598 A1 | 12/2020 | Spector et al. |
| 2021/0027061 A1 | 1/2021 | Xu et al. |
| 2021/0089637 A1 | 3/2021 | Cummins et al. |
| 2021/0104008 A1 | 4/2021 | Ross et al. |
| 2021/0110004 A1 | 4/2021 | Ross et al. |
| 2021/0134434 A1 | 5/2021 | Riley et al. |
| 2021/0202067 A1 | 7/2021 | Williams et al. |
| 2021/0240837 A1 | 8/2021 | Tseng et al. |
| 2021/0258155 A1 | 8/2021 | Andon et al. |
| 2021/0279475 A1 | 9/2021 | Tusch et al. |
| 2021/0326467 A1 | 10/2021 | Levy et al. |
| 2021/0366014 A1 | 11/2021 | Wang et al. |
| 2021/0366586 A1 | 11/2021 | Ryan et al. |
| 2022/0292396 A1 | 9/2022 | Biryukov et al. |
| 2024/0064135 A1 | 2/2024 | Sherlock et al. |
| 2024/0185596 A1 | 6/2024 | Neuschäet al. |
| 2024/0214194 A1 | 6/2024 | Kapur et al. |
| 2024/0340314 A1 | 10/2024 | Radon et al. |

FOREIGN PATENT DOCUMENTS

| | | | |
|---|---|---|---|
| WO | WO-2011/016710 | A1 | 2/2011 |
| WO | WO-2016/083987 | A1 | 6/2016 |
| WO | WO-2019/013818 | A1 | 1/2019 |
| WO | WO-2019/123291 | A1 | 6/2019 |

OTHER PUBLICATIONS

Yan Zhang et al., Real-time Machine Learning Prediction of an Agent-Based Model for Urban Decision-making, URL: https://ifaamas.org/Proceedings/aamas2018/pdfs/p2171.pdf (Jul. 10-15, 2018).

SECURE MULTI-VERIFICATION OF BIOMETRIC DATA IN A DISTRIBUTED COMPUTING ENVIRONMENT

TECHNICAL FIELD

The present disclosure relates to secure multi-verification of biometric data in a distributed computing environment.

BACKGROUND

Client applications can access resources from servers. In many cases, applications utilize authenticating information or profiles to access computing systems. However, using such authentication credentials in a distributed computing environment introduces undesired network security issues.

SUMMARY

One aspect of the present disclosure relates to a method for verifying data packages with biometric data. The method may be performed, for example, by a computing system comprising one or more processors coupled to a non-transitory memory. The method may include receiving, from a first computing device of a first user, a first request to grant an authorization to a second user. The first request may include first biometric data corresponding to the first user and second biometric data corresponding to the second user. The method may include generating an authorization token based on the first request from the first computing device. The method may include transmitting the authorization token to a second computing device of the second user. The method may include receiving, from a third computing device, a second request to authorize the second user. The second request may include one or more data packages. The method may include verifying the second request. Verifying the second request may include analyzing the one or more data packages to determine that the one or more data packages include the authorization token, third biometric data, and provenance data corresponding to the authorization token and the third biometric data and, based on the provenance data, verify that the authorization token and third biometric data were received by the third computing device from the second computing device within a predetermined time period. The method may include generating, in response to verifying the second request, a metric corresponding to similarity between the second biometric data and the third biometric data. The method may include, in response to determining that the metric exceeds a threshold, transmitting an indication that the grant of authorization to the second user is verified to at least one of the first computing device, the second computing device, the third computing device, or a fourth computing device.

In some implementations, the method can further include transmitting at least one of the authorization token or a second digital token to a second computing device based on verification of the grant of authorization. In some implementations, at least one of the first biometric data or the second biometric data may be based on a plurality of biometric scans. In some implementations, the plurality of biometric scans may include scans of multiple different modalities. In some implementations, the multiple different modalities may include a plurality of a facial scan, a fingerprint scan, and a voice sample.

In some implementations, the provenance data may identify a source of the authorization token and the third biometric data, and a device used to obtain the authorization token and the third biometric data. In some implementations, the first request may further include second provenance data corresponding to at least one of the first biometric data or the second biometric data. In some implementations, the second provenance data may include a plurality of timing of biometric scans, scanners used to capture the biometric scans, and number or type of errors or failed attempts corresponding to biometric scans. In some implementations, the first request may further include one or more media files, one or more audio files, video files, or images captured using at least one of the first computing device or the second computing device.

In some implementations, the one or more media files may include at least one of an audio file or a video file of the first user speaking a phrase or performing an action. In some implementations, the method can further include analyzing the audio file or the video file to verify the phrase based on a script corresponding to the authorization to be granted. In some implementations, the method can further include verifying sounds in the audio file or the video file based on a voice signature in a first digital identity profile of the first user. In some implementations, the method can further include verifying at least one of the first biometric data and the second biometric data based on biometric data in at least one of a first digital identity profile of the first user and a second digital identity profile of the second user.

In some implementations, at least one of the first digital identity profile or the second digital identity profile may be maintained by the computing system. In some implementations, the computing system may be a first computing system. In some implementations, at least one of the first digital identity profile or the second digital identity profile may be maintained by a second computing system. In some implementations, the method can further include adding an identification of the first request to at least one of a first digital identity profile of the first user or a second digital identity profile of the second user.

In some implementations, the method can further include adding the authorization token to at least one of a first digital identity profile of the first user or a second digital identity profile of the second user. In some implementations, the method can further include verifying the first computing device based on a first digital identity profile of the first user. In some implementations, the method can further include identifying the second computing device based on a second digital identity profile of the second user. In some implementations, the third computing device may be associated with a third computing system granting the authorization to the second user.

Another aspect of the present disclosure relates to a system configured for verifying data packages with biometric data. The system may include a computing system comprising one or more processors coupled to a non-transitory memory. The system can receive, from a first computing device of a first user, a first request to grant an authorization to a second user. The first request may include first biometric data corresponding to the first user and second biometric data corresponding to the second user. The system can generate an authorization token based on the first request from the first computing device. The system can transmit the authorization token to a second computing device of the second user. The system can receive, from a third computing device, a second request to authorize the second user. The second request may include one or more data packages. The system can verify the second request. Verifying the second request may include analyzing the one or more data packages to determine that the one or more data packages include the authorization token, third biometric data, and provenance data corresponding to the authorization token and the third biometric data and, based on the provenance data, verify that the authorization token and third biometric data were received by the third computing device from the second computing device within a predetermined time period. The system can generate, in response to verifying the second request, a metric corresponding to similarity between the second biometric data and the third biometric data. The system can, in response to determining that the metric exceeds a threshold, transmit an indication that the grant of authorization to the second user is verified to at least one of the first computing device, the second computing device, the third computing device, or a fourth computing device.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations, and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular form of 'a,' 'an,' and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
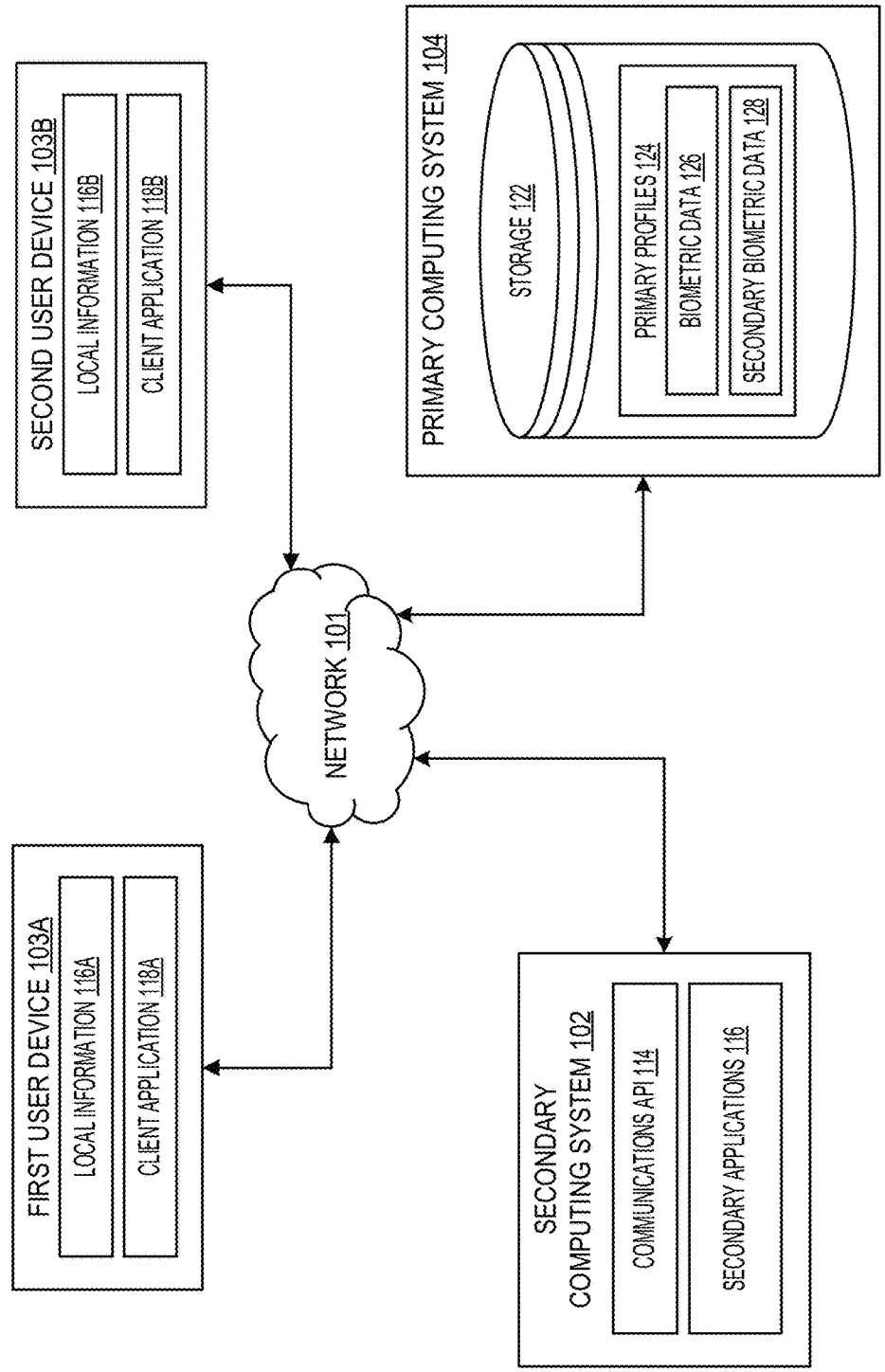
FIG. 1 is a block diagram of an example system for secure multi-verification of biometric data in a distributed computing environment, in accordance with one or more example implementations.

Below are detailed descriptions of various concepts related to, and implementations of, techniques, approaches, methods, apparatuses, and systems for secure multi-verification of biometric data in a distributed computing environment. The various concepts introduced above and discussed in detail below may be implemented in any of numerous ways, as the described concepts are not limited to any particular manner of implementation. Examples of specific implementations and applications are provided primarily for illustrative purposes.

Various embodiments described herein relate to secure multi-verification of biometric data in a distributed computing environment. Client applications can access resources from servers. In many cases, applications utilize authenticating information or profiles to access computing systems. However, using such authentication credentials in a distributed computing environment introduces undesired network security issues. Particularly, sharing authentication credentials alone presents security issues as cyber attackers can utilize fraudulent techniques, phishing techniques, or other techniques to fraudulently obtain and utilize authentication credentials. When subject to a security breach, network authentication credentials can be utilized to impersonate other users and obtain information that would otherwise remain secure, effectively resulting in a security breach of large portions of data.

To address these and other issues, the present techniques can implement secure multi-verification of biometric data in a distributed computing environment, particularly in circumstances where users intend to share authentication credentials. Rather than permit insecure sharing of authentication credentials, the present techniques provide secure and distributed multi-verification processes to grant a second user (or grant multiple users) access to resources of a first user (or resources of multiple users). This can be performed by authenticating biometric data of the first user and the second user, and by generating access tokens for the second user to access or utilize the resources that would otherwise be secured by an authentication credential of the first user. The present techniques therefore improve network security and efficiency by maintaining records of multiple users that are authorized to access certain network resources.

As used herein, biometric data may be a transformation, a tokenization, or otherwise a representation of user biometrics (e.g., facial recognition, iris identification, fingerprinting, genomic data, behavioral data, signatures, voice, etc.). A user's biometric may be a sample captured in real time using a sensor, and the sample may be compared with a biometric template that was previously enrolled and stored for use by a "matcher" that compares the biometric sample with the biometric template to generate a score indicating how similar the biometric sample is to the biometric template; the matcher may output a score, which may indicate a "pass" (e.g., if the score is at least as great as a threshold), or a "fail" (e.g., if the score is below the threshold). This is further discussed below with reference to FIGS. 5 to 8. In certain implementations, the biometric data as used herein could be, or could include, biometrics themselves (e.g., an encrypted version of the biometric sample). In certain embodiments, if privacy and security concerns are sufficiently high, the biometrics themselves may not be shared with third-parties, and biometric data that is a representation of the biometrics may instead be shared. As used herein, in various embodiments, multi-verification may refer to the use of multiple modalities, multiple biometric scans (of the same type or of different types), and/or use of multiple features or attributes of users or user identities.

It is noted that biometric data can be used in identification (e.g., determine who a user is) and/or authentication (e.g., confirm the user is actually the user), but biometrics, by themselves, do not provide authorization (e.g., a granting of permission or allocation by a user or a system). Verifications may involve some combination of (or all of) authentication, authorization, and/or identification, and may rely on different technologies and data for each.

Referring to FIG. 1, illustrated is a block diagram of an example system 100 for secure multi-verification of biometric data in a distributed computing environment, in accordance with one or more example implementations. The system 100 may include a first user device 103A and a second user device 103B (sometimes collectively referred to the "user devices 103," or as the "user device 103" when referring to functionality or structure of either device individually), a secondary computing system 102, and a primary computing system 104. Each of the secondary computing system 102, the primary computing system 104, and the user devices 103 can be in communication with one another via the network 101. The network 101 can facilitate communications among the user devices 103, the secondary computing system 102, and the primary computing system 104 over, for example, the internet or another network via any of a variety of network protocols, such as Ethernet, Bluetooth, Cellular, or Wi-Fi.

Each component of the system 100 may include one or more processors, memories, network interfaces, and user interfaces. The memory may store programming logic that, when executed by the processor, controls the operation of the corresponding computing device. The memory may also store data in databases. The network interfaces allow the computing devices to communicate wirelessly or otherwise. The various components of devices in system 100 may be implemented via hardware (e.g., circuitry), software (e.g., executable code), or any combination thereof.

The secondary computing system 102 can include at least one processor and a memory (e.g., a processing circuit). The memory can store processor-executable instructions that, when executed by a processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The secondary computing system 102 can include one or more computing devices or servers that can perform various functions as described herein. The secondary computing system 102 can include any or all of the components and perform any or all of the functions of the computer system 400 described herein in conjunction with FIG. 4.

The secondary computing systems 102 may be computing systems of information technology service providers, social media platforms, webservers, chatrooms, forums, or any other computing system that may maintain information about or relating to one or more users, such as a third-party computing system. Secondary computing systems 102 of non-financial institutions may be associated with marketing platforms, social media platforms, network environment platforms, network configuration platforms, or user databases, among others. The secondary computing systems 102 may each include one or more network interfaces that facilitate communication with other computing systems of the system 100 via the network 101. In some implementations, one or more of the secondary computing systems 102 may be owned or controlled by a single entity. The secondary computing system 102 can be any type of computing system that can perform one or more operations for a user, either in response to an authentication credential (e.g., a password, email, PIN, etc.), or in response to receiving an access token from the primary computing system 104 using the techniques described herein.

Each user device 103 can include at least one processor and a memory (e.g., a processing circuit). The memory can store processor-executable instructions that, when executed by a processor, cause the processor to perform one or more of the operations described herein. The processor may include a microprocessor, an ASIC, an FPGA, etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions may include code from any suitable computer programming language. Each user device 103 can include one or more computing devices (e.g., desktop computers, laptop computers, servers, smartphones, tablets, etc.) that can perform various functions as described herein. Each user device 103 can include any or all of the components and perform any or all of the functions of the computer system 400 described herein in conjunction with FIG. 4.

Each user device 103 may include mobile or non-mobile devices, such as smartphones, tablet computing devices, wearable computing devices (e.g., a smartwatch, smart optical wear, etc.), personal computing devices (e.g., laptops or desktops), voice-activated digital assistance devices (e.g., smart speakers having chat bot capabilities), portable media devices, vehicle information systems, or the like. Each user device 103 may access one or more software applications running locally or remotely (e.g., the client applications 118A or 118B). Each user device 103 may operate as a "thin client" device, which presents user interfaces for applications that execute remotely (e.g., at the primary computing system 104, etc.). Each user device 103 can be associated with a respective device identifier. The identifier may be a universally unique identifier (UUID), a globally unique identifier (GUID), a media access control (MAC) address, an internet protocol (IP) address, a device serial number, a serial number of a component of each respective user device 103, a predetermined or randomly generated value associated with each respective user device 103, or any type of identifier that identifies each respective user device 103 or the components thereof. Input from the user received via each user device 103 may be communicated to the server (e.g., the primary computing system 104) executing the remote application, which may provide additional information to each user device 103 or execute further operations in response to the user input.

The first user device 103A includes a client application 118A and the second user device 103B includes a client application 118B. The client application 118A and the client application 118B are sometimes referred to as the "client application(s) 118," the client application 118A can include and perform all of the functionality of the client application 118B, and vice versa. The client application 118 can execute on a respective user device 103, and can provide one or more user interfaces and receive user input via one or more input/output (I/O) devices of the respective user device 103. The client application 118 may be provided by or be associated with the primary computing system 104. The client applications 118 may be web-based applications that are retrieved and displayed in a web-browser executing at the primary computing system 104. The client application 118 can execute locally at a respective user device 103 and may communicate information with the primary computing system 104 via the network 101. The client application 118 can access one or more device identifiers using an application programming interface (API) of an operating system of the respective user device 103. In some implementations, the client application 118 can access a predetermined region of memory where the user device 103 stores one or more device identifiers. Each of the user devices 103A and 103B may be similar or different types of computing devices. For example, the user device 103A may be a laptop and the user device 103B may be a smartphone.

Each client application 118A and 118B (sometimes referred to as "the client application(s) 118") can present one or more user interfaces, for example, in response to user input or interactions with displayed interactive user interface elements. The user interfaces can be utilized to present information to the user or to receive information or input from the user. In an embodiment, the user interfaces can prompt the user to capture biometric scan data (e.g., images of the user's face, fingerprint scans, one or more voice samples, an iris scan (or an image of the user's eye), palm or finger vein patterns, retinal scans, etc.). The user interface may include interactive elements that, when interacted with, cause the user device 103 to transmit one or more requests, data packets, or other data related to the techniques described herein. For example, the client application 118 can provide or update identity elements relating to a particular user, or one or more security tokens, to the primary computing system 104 as described herein. Additionally, the client application 118 may receive display instructions to display various content (e.g., text, graphics, video, prompts, alerts, notifications, indications, etc.) from the primary computing system 104. The user interfaces can include any type of interactive user interface element, including those that enable a user to provide information that can be stored in the primary profiles 124, send requests, or to navigate between user interfaces of the client application 118. Additionally, the client applications 118 can receive or present information relating to one or more secured digital assets provided by the primary computing system 104. An example user interface that may be presented by the client application 118 is shown in FIG. 2.

In various embodiments, the computational capabilities of mobile devices (or user devices), such as Artificial Intelligence/Machine Learning (AI/ML) engines, central processing units (CPUs), graphical processing units (GPUs), secure enclave capabilities, different networking capabilities (such as cellular, Wi-Fi, Bluetooth, etc.), voice processing, image processing, etc.). In certain embodiments, Distributed Ledger Technology ("DLT") (e.g., blockchain) may be used to secure the information. Use of DLT securing the information may provide an immutable lineage for information. As discussed further below with respect to FIGS. 5 to 8, biometric data may stay at the user device and tokens representing the biometric information may be used. In certain embodiments, information may be exchanged by user devices by leveraging existing communication capabilities. It is noted that functionalities discussed herein may be provided through a client application (or extension thereof) that runs on the user devices to enable various capabilities discussed herein.

Figure 2:
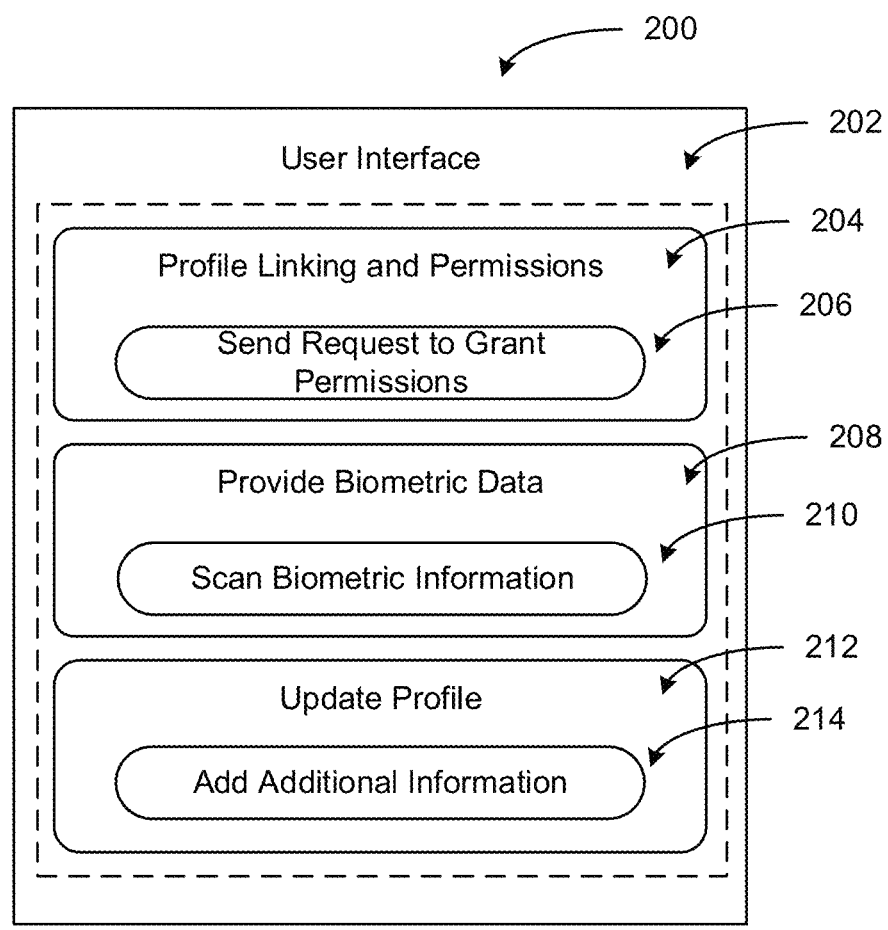
FIG. 2 illustrates an example user interface that may be displayed on one or more computing devices when implementing the techniques described herein, in accordance with one or more example implementations.

Referring briefly to FIG. 2, illustrated is an example user interface 200 that may be presented when implementing one or more of the functionalities described herein. FIG. 2 provides various interactive user interface elements that can be interacted with to perform various functionality described herein, according to an example implementation. The user interface 200 includes an interface feature 202. The interface feature 202 may include an interface to grant authorization for a second user including providing biometric data, or updating a profile of the user. As shown in FIG. 2, the interface feature 202 includes one or more interactive features shown as a first feature 204, a second feature 208, and a third feature 212. It should be understood that the interface feature 202 may include more or fewer interactive features than as shown in FIG. 2.

The first feature 204 may include a first interactive feature 206. The first feature 204 may depict information related to requesting to grant authorization to a second user, for example, to act on behalf of the user presenting the user interface 200 or to access digital assets or digital resources of the user. For example, selection of the first interactive feature 206 can cause the user device 103 to generate a request to grant an authorization to a second user, which may include capturing biometric data via one or more sensors, as described herein.

The second feature 208 may include a second interactive feature 210. The second feature 208 may depict information related to providing up-to-date biometric data via one or more sensors of the user device 103. For example, the user may provide biometric scan data as part of authorizing a second user to access digital resources of the user or to act on behalf of the user. Biometric data may also be utilized to authenticate the user, or to update a profile (e.g., a primary profile 124) of the user by communicating with the primary computing system 104. Selection of the second interactive feature 210 can cause the user device 103 to initiate a scan of biometric data using the sensors of the user device 103, as described herein.

The third feature 212 may include a third interactive feature 214. The third feature 212 may depict information related to updating (or creating) a profile (e.g., the primary profile 124) of the user. Selection of the third interactive feature 214 may cause the user device 103 to accept additional or more up-to-date information for the profile, and to transmit the additional or up-to-date information to the primary computing system 104 in a request to update the primary profile 124 of the user. For example, the user can provide any information that may be stored at the primary profile 124 via interactive user interface elements presented at the user device 103.

Referring back to FIG. 1, each user device 103 can include one or more sensors, which may include one or more biometric sensors or ambient sensors, or any other type of sensor capable of capturing information about a user or an environment in which the user is present. The sensors can include components that capture images, video, ambient lights, and sounds. Examples of such sensors can include cameras and microphones. The sensors or I/O components of the user device 103 can enable the user to provide inputs (e.g., a touchscreen, stylus, force sensor for sensing pressure on a display screen, and biometric components such as a fingerprint reader, a heart monitor that detects cardiovascular signals, an iris scanner, and so forth). The sensors may include one or more location sensors to enable each user device 103 to determine its location relative to, for example, other physical objects or relative to geographic locations. Example location sensors include global positioning system (GPS) devices and other navigation and geolocation devices, digital compasses, gyroscopes and other orientation sensors, as well as proximity sensors or other sensors that allow each user device 103 to detect the presence and relative distance of nearby objects and devices.

Each user device 103 can store local information 116 in the memory of the respective user device 103. The local information 116 may include stored preferences (e.g., personal user settings, saved login information, previously scanned biometric data, stored authentication credentials, etc.) or other information relating to the use of the client application 118. In various embodiments, Device 1 (D1) of User 1 (e.g., a child) might include a biometric template of User 1 and User 2 (e.g., the child's mother), so User 2 biometric data may be used to verify on the child's (U1) device (D1) as a parental control. This is further discussed below with reference to FIGS. 5 to 8. The local information 116 can be stored in the memory of the user device 103 and can be accessed and modified by the user by accessing corresponding user interfaces of the client application 118. In some implementations, the local information 116 can be transmitted to the primary computing system 104 or the secondary computing system 102 for storage in the primary profile 124 of the user, respectively. The user, when accessing a client application 118 on a different device, can access the primary computing system 104 using an identifier of the primary profile 124 (e.g., log in to the primary computing system 104) and synchronize (e.g., download and store) the local information 116 on the different device.

The primary computing system 104 can include at least one processor and a memory (e.g., a processing circuit). The memory can store processor-executable instructions that, when executed by the processor, cause the processor to perform one or more of the operations described herein. The processor may include a microprocessor, an ASIC, an FPGA, etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions may include code from any suitable computer programming language. The primary computing system 104 can include one or more computing devices or servers that can perform various functions as described herein. The primary computing system 104 can include any or all of the components and perform any or all of the functions of the computer system 400 described herein in conjunction with FIG. 4.

The primary computing system 104 can be a computing system of an entity that maintains digital identity profiles (e.g., the primary profiles 124) for a number of different users. The primary computing system 104 can provide information to the client application 118 executing on a respective user device 103 of a corresponding user, such as user interfaces (e.g., the user interface 200 of FIG. 2, other user interfaces, etc.), instructions to carry out one or more functionalities described herein, or other information relating to one or more of primary profiles 124. For example, the primary computing system 104 can receive various datasets from the user devices 103, and can perform the operations described in connection with FIG. 3 to authorize other users to act on behalf of the user or to access digital assets or network resources of the user. A respective user can utilize the client application 118 of a respective user device 103 to communicate with the primary computing system 104, for example, to create, modify, delete, or authorize information in connection with a primary profile 124 associated with the user, including any of the functionalities described herein (e.g., any operations described in connection with FIG. 3, etc.). The primary computing system 104 can be a backend computer system that interacts with the user devices 103 and supports various services offered by the primary computing system 104, such as information technology (IT) services or network management services. The network management services may utilize the information in one or more of the primary profiles 124 to manage information communicated via the network 101.

The primary computing system 104 can include a storage 122, which may be any type of computer-accessible memory or database that can maintain, manage, or store primary profiles 124, for example, in one or more data structures. Each of the primary profiles 124 may correspond to a respective user and may be identified by a corresponding user identifier (e.g., a username, an email address, a passcode, an encryption key, etc.). The primary profiles 124 can include information about the user, including personally identifying data (e.g., name and social security number), psychographics data (e.g., personality, values, opinions, attitudes, interests, and lifestyles), transactional data (e.g., preferred products, purchase history, transaction history), demographic data (e.g., address, age, education), financial data (e.g., income, assets, credit score), or other user or account data that is maintained or otherwise accessible to the primary computing system 104. The primary computing system 104 can receive datasets to update the primary profile 124 for a user from a respective user device 103, for example, in a request with a corresponding security token. The primary profiles 124 (sometimes referred to as an "identity profile" or an "identity databank") can be accessed via a client application 118, for example, by way of user input at a user device 103 corresponding to a respective user of the primary profile 124. The primary profile 124 can identify one or more user devices 103 of the user to which the primary profile 124 corresponds (e.g., and additional computing devices may be registered to the primary profile 124 by way of request including two-factor authentication, for example). A primary profile 124 can identify one or more user devices 103 of the user to which the primary profile 124 corresponds.

Each of the primary profiles 124 can include biometric data 126 of the user, which may be generated by the sensors of the respective user device 103. The biometric data 126 can include any type of biometric information, such as images of the user's face, fingerprint scans, one or more voice samples, an iris scan (or an image of the user's eye), palm or finger vein patterns, retinal scans, or the like. The biometric data 126 of the user may also include one or more documents that include biometric information (e.g., eye color, hair color, height, weight, etc.), such as a driver's license of the user, a passport of the user, or any other type of identifying document. The biometric data 126 can be provided to the primary computing system 104 via a user device 103 of the user. The primary computing system 104 may periodically, or according to another type of schedule or policy, request up-to-date biometric data 126 from the user for storage in the user's primary profile 124.

When utilizing the techniques described herein to authorize a second user to access the user's digital assets or network resources (or to operate on the user's behalf), the primary computing system 104 may store secondary biometric data 128, corresponding to a second user, in the primary profile 124 of a first user (e.g., the user). The secondary biometric data 128 may be similar in content to the biometric data 126, but may instead correspond to a different user that the first user (e.g., associated with the primary profile 124) has authorized to access the user's digital assets or network resources (or to operate on the user's behalf). The secondary biometric data 128 may be provided to the primary computing system 104 by a second user device 103, which may be different from the user device 103 associated with the primary profile 124.

The primary profiles 124 can be stored in association with one or more identifiers of one or more user devices 103. Identifiers of a primary profile 124 can be used by a client application 118 (e.g., with an authentication credential) to access the functionality of the primary computing system 104, which may include information relating to account functionality. The primary profile 124 may identify one or more accounts associated with the user. The identifiers or authentication credentials of the primary profiles 124 can include a username, a password, an e-mail address, a phone number, a personal identification number (PIN), a secret code-word, or device identifiers for use in a two-factor authentication technique, among others.

A primary profile 124 may be created or updated by the primary computing system 104 in response to a primary profile 124 creation request transmitted by a user device 103. The user profile creation request can include any of the primary profile 124 information described herein. The primary profiles 124 (or the identity elements 126 thereof) can include information about an account (e.g., a financial account) maintained by an entity associated with the primary computing system 104. The information can include, for example, account balances, transaction histories, or brokerage/trading information, among other account data. Additionally, the primary profile 124 can include a list or table of secondary account (e.g., secondary profiles, etc.) identifiers associated with the user and maintained or stored at third-party computing systems.

Additionally, the primary profile 124 can be updated with additional information using the client application 118. For example, the client application 118 can transmit information to store in the primary profile 124 (e.g., one or more datasets, biometric information, or other types of information) in a request to update the primary profile 124. The primary computing system 104 may request an authentication credential (e.g., using techniques similar to those described herein, including biometric data, etc.), and can update the primary profile 124 with the information in the request upon determining that the authentication credential is legitimate. For example, the primary computing system 104 can verify that the authentication credential is valid prior to updating the primary profile 124.

Information stored at the secondary computing system 102 can be accessed, for example, by the user devices 103 or the primary computing system 104 using a communications application programming interface (API) 114. The primary computing system 104 can maintain and provide the communications API 114. The communications API 114 can be any type of API, such as a web-based API corresponding to a particular network address uniform resource identifier (URI), or uniform resource locator (URL), among others. The communications API 114 can be accessed, for example, by one or more of the user devices 103 or the primary computing system 104, via the network 101. The communications API 114 can be a client-based API, a server API (SAPI), or an Internet Server API (ISAPI).

Various protocols may be utilized to access the communications API 114, including a representational state transfer (REST) API, a simple object access protocol (SOAP) API, a Common Gateway Interface (CGI) API, or extensions thereof. The communications API may be implemented in part using a network transfer protocol, such as the hypertext transfer protocol (HTTP), the secure hypertext transfer protocol (HTTPS), the file transfer protocol (FTP), the secure file transfer protocol (FTPS), each of which may be associated with a respective URI or URL. The communications API 114 may be exposed to the user devices 103 or the primary computing system 104, which can execute one or more API calls to perform the various operations described herein. In an embodiment, the user devices 103 or the primary computing system 104 include an API that is similar to the communications API 114, which the user device 103 or the primary computing system 104 can use communicate with other computing devices to perform the various operations described herein.

The secondary computing system 102 can execute one or more secondary applications 116, which may implement one or more services or operations, including providing access to a digital resource or to a secured network location. The secondary computing system 102 can provide access to such resources of a first user upon receiving an indication that a grant of authorization for the second user is verified from the primary computing system 104. Therefore, the secondary computing system 102 can execute one or more secondary applications 116 that enable a second user to access the resources of a first user without the first user sharing their authentication credentials and without creating unnecessary network security issues. Some example services include management of retirement products, personal loans, home equity loans, or other financial products, management of accounts of the first user, management of secured media files of the first user, among other operations. In an embodiment, the secondary computing system can maintain or store one or more of the primary profiles 124 for one or more users. In such embodiments, the primary computing system can communicate with the secondary computing system 102 to retrieve or access the primary profiles 124 of such users.

Figure 3:
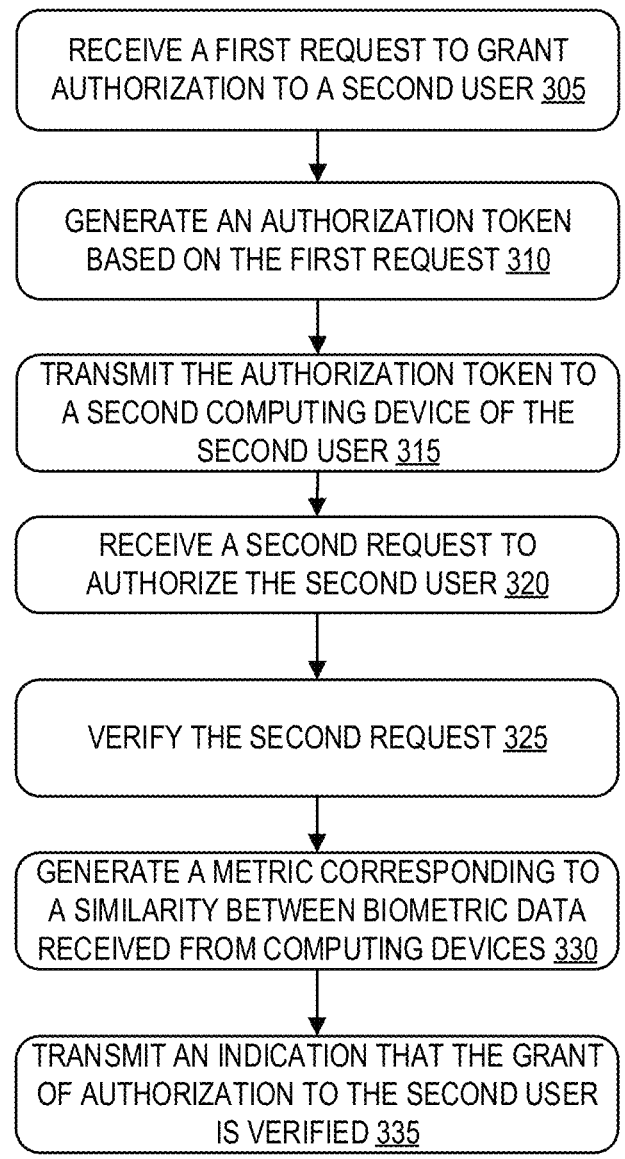
FIG. 3 is a flow diagram of an example method for secure multi-verification of biometric data in a distributed computing environment, in accordance with one or more example implementations.

Referring to FIG. 3, illustrated is a flow diagram of an example method 300 for secure multi-verification of biometric data in a distributed computing environment, in accordance with one or more example implementations. The method 300 can be a computer-implemented method. The method 300 may be implemented, for example, using any of the computing systems described herein, such as the primary computing system 104, the secondary computing system 102, the user device 103, or the computing system 400 described in connection with FIG. 4. In some implementations, additional, fewer, or different operations may be performed. It will be appreciated that the order or flow of operations indicated by the flow diagrams and arrows with respect to the methods described herein is not meant to be limiting. For example, in one implementation, two or more of the operations of method 300 may be performed simultaneously, or one or more operations may be performed as an alternative to another operation.

At step 305, the method 300 can include receiving, from a first computing device (e.g., the user device 103A) of a first user, a first request to grant an authorization to a second user. The first request can include first biometric data (e.g., the biometric data 126) corresponding to the first user and second biometric data (e.g., the secondary biometric data 128) corresponding to the second user. To capture the first biometric data of the user, the first computing device can scan a physical feature of the first user. As described herein, the first computing device can include components that capture images, video, audio, ambient lights, or sounds (such as cameras and microphones). User interfaces on an application (e.g., the client application 118) executing on the computing device can prompt the user to provide biometric inputs for generating encrypted user data (e.g., information in the primary profiles 124). The physical feature scanned using the sensor can be, but is not necessarily limited to, a picture of the user's face, a fingerprint of the user, a heart rate or heart rate pattern of the user, an iris scan of the user, a retinal scan of the user, or the like. The second biometric data of the second user can be scanned using similar techniques by the second computing device, and provided to the first computing device for inclusion in the request. Upon receiving the first request, the primary computing system can store an identification of the first request in a first digital profile (e.g., a primary profile 124) of the first user or a second digital profile (e.g., a primary profile 124) of the second user.

In an embodiment, the first biometric data or the second biometric data can include multiple biometric scans of multiple physical features of the first or second users. The multiple scans may be captured sequentially by the first or second computing device and transmitted to the primary computing system (e.g., the computing system performing the method 300). The multiple scans can include scans of multiple different modalities, which may correspond to different types of data (e.g., audio data, video data, image data, fingerprint data, retinal data, facial scan data, etc.). For example, audio may comprise or represent voiceprint biometrics, video may comprise or represent facial, iris, and/or information on a user's gait, and an image may comprise or represent facial or iris information. It is noted that, in some embodiments, for more critical authorization requirements, live media data may be required (e.g., capturing the person and identity together in a motion picture, with images not being deemed sufficient). Additionally, the first request can include provenance data, which can correspond to the first biometric data or the second biometric data. The provenance data can include various metadata relating to the biometric scans of the first or second user, including timestamps of biometric scans, identifiers of the scanners, components, or devices used to capture the biometric scans, and a number or type of errors or failed attempts that may have occurred when capturing the biometric scans. This metadata can be stored in association with the biometric scan data provided to the primary computing system.

Additionally or alternatively, the biometric data may be extracted and analyzed at the primary computing system to generate the first and second biometric data. For example, the first request further may include one or more media files, such as audio files, video files, or images captured using the first computing device or the second computing device. The media files can be, for example, an audio file or a video file of the first user speaking a phrase or performing an action. For example, the primary computing system can transmit display instructions to the first or second computing devices that cause the first or second computing devices to display user interfaces relating to biometric information. The user interfaces can prompt the user to speak predetermined phrases or predetermined or desired portions of the user data (e.g., name, address, date of birth, etc.). The voice of the user can may be applied to a natural language processing (NLP) model (e.g., which may be trained using machine-learning techniques by the primary computing system 104). The NLP model may be executed by the primary computing system to extract the biometric data. Similar techniques can be applied to the video or image files, which can be analyzed by executing suitable machine-learning models (e.g., feature or biometric data extraction models) to extract the biometric data corresponding to the first or second user.

At step 310, the method 300 can include generating an authorization token based on the first request from the first computing device. Generating the authorization token may be performed by executing any suitable tokenization function or algorithm. For example, the security token can be a generated hash value of user data associated with the first user, such as the first or second biometric data (or combinations thereof). In some implementations, a predetermined salt value or other deterministic information may be added to the information that is hashed to generate the authorization token in response to the request. Upon generating the authorization token, the primary computing system can store the authorization token in a first digital profile of the first user or a second digital profile of the second user. Additionally, the primary computing system may first authenticate the first user or second user based on the first or second biometric information, respectively, prior to generating the authorization token. If the first and second user are authenticated, the primary computing system can generate the authorization token. Otherwise, the primary computing system can transmit a corresponding error message to the first computing device that provided the first request.

To authenticate the first or second user, the primary computing system may compare the biometric data received in the first request to biometric data previously received by the primary computing system can stored in one or more digital profiles (e.g., the primary profiles 124 of the first and second users). If the biometric data matches (or matches within a predetermined tolerance range) the previously stored biometric data in the profiles, the biometric data can be considered valid, and the first or second user can be considered authenticated. In an embodiment where audio files or video files are provided in the first request, the primary computing system can analyze the audio file or the video file. For example, if the user was instructed to speak a predetermined phrase, the primary computing system can execute an NLP model to identify words or phrases spoken by the user. The words or phrases generated by the NLP model can be compared to a script that was generated by the primary computing system (and provided to the first or second computing system via display instructions). The script may be generated in response to a corresponding request to generate biometric data received from the first or second computing devices.

Additionally, the first or second computing devices may be authenticated or verified by accessing identifiers of associated computing devices in the digital profiles of the first and second users. If the computing device accessing the primary computing system is not otherwise associated with the digital profile of the first or second user, the primary computing system may transmit an error message that the computing device is unverified and may request additional verification information (e.g., user data, passwords, emails, answers to security questions, etc.) to verify the computing device. Otherwise, if the computing device is identified in the digital profiles of the first or second users, the primary computing system can verify the computing devices.

Additionally or alternatively, the primary computing system can verify sounds in the audio file or the video file based on a voice signature stored as part of the biometric data in the first digital profile of the first user. The voice signature may be previously generated by the primary computing system from previously provided voice data of the user. For example, the primary computing system can generate the voice signature by performing one or more feature extraction techniques over audio data captured from the user, for example, to reduce the size of the data. Reducing the size of the data provided by the user allows for increased efficiency when utilizing the voice signature to perform further processing steps, such as user authentication. A similar voice signature can be generated from sounds extracted from the audio file, which is then compared to the voice signature in the digital profile of the user to verify the user (e.g., if there is a match or if there is a similarity within a predetermined tolerance range).

At step 315, the method 300 can include transmitting the authorization token to a second computing device of the second user. After generating the authorization token, the primary computing system can transmit the authorization token to the second computing device of the second user, which may be identified by accessing a corresponding identifier of the second computing device from the second digital profile of the second user. Alternatively, the second computing device may be identified in the first request. In another embodiment, the primary computing system can transmit the authorization token to the first computing device of the first user, which itself can provide the authorization token to the second computing device of the second user. For example, the first computing device may communicate the authorization token to the second computing device via near-field communication (NFC), Bluetooth, Wi-Fi, or via a network (e.g., the network 101).

At step 320, the method 300 can include receiving, by the computing system, from a third computing device (e.g., the secondary computing system 102), a second request to authorize the second user. The second request can include one or more data packages. After receiving the authorization token, the second computing device can be utilized to access the digital resources, secured network locations, or to act on behalf of, the first user or the first computing device. In effect, the authorization token acts as an authorization mechanism to authorize the second user to access digital assets of the first user. To do so, the second computing system can provide the authorization token to a third computing system, which can then communicate the authorization token to the primary computing system in one or more data packages in a request to authenticate the second user as a proper user of the authorization token. As such, the request received by the primary computing system from the third computing system can be a request to verify the authorization token received from the second computing device.

At step 325, the method 300 can include verifying the second request. Verifying the second request can include analyzing the one or more data packages to determine that they include the authorization token, third biometric data, and provenance data corresponding to the authorization token and the third biometric data. To verify the second request, the primary computing system can extract the information from the one or more data packages to determine that the data packages include the following requisite information: the authorization token, third biometric data corresponding to the second user, and provenance data. The provenance data can be information that identifies the computing device from which (e.g., the source) the third computing device received the authorization token and the third biometric data. If the primary computing system determines that the source is the second computing device, the primary computing system can verify the second request includes information provided by the second computing device of the second user. Additionally, the provenance data may include an identifier of the device used to obtain the authorization token and the third biometric data (e.g., the third computing device). To verify such the identifier of the third computing device, the primary computing system can determine whether the identifier of the third computing device is included in a blacklist of insecure or untrusted computing devices. If the identifier is not included in the blacklist, or if the identifier is included in a whitelist of secure and trusted computing devices, the identifier can be verified.

The provenance data may also include other data that the primary computing system can verify in order to determine whether the one or more data packages are valid. For example, the provenance data can include metadata regarding the authorization token and the third biometric data.

The metadata can include information about a geophysical location of the third computing device or the second computing device, a timestamp of when the authorization token was transmitted by the second computing device to the third computing device, and various local settings (e.g., the local settings 116), which may include data relating to the configuration or hardware components of the second or third computing devices. The provenance data may also include data about the scanners used to capture the third biometric data, and a number or type of errors or failed attempts corresponding to biometric scans for the third biometric data. The primary computing system can verify the information in the provenance data against the data previously received about the second computing device (e.g., previously received provenance data) to ensure that the second computing device transmitted the authorization token and the third biometric data to the third computing device.

Additionally, verifying the second request may include verifying that the authorization token and third biometric data were received by the third computing device from the second computing device within a predetermined time period. In an embodiment, the provenance data can include information about when the third computing device received the one or more data packages. In another embodiment, the second computing device of the second user can transmit a message to the primary computing system indicating when the second computing device provided the authorization token and the third biometric data to the third computing device. Using this time information, the primary computing system can determine that the one or more data packages are recent by determining that the authorization token and third biometric data were provided to the primary computing system within a predetermined time interval (e.g., from being provided to the third computing device). For example, the primary computing system can verify that the third computing system transmitted the one or more data packages within fifteen minutes (or another predetermined time interval) of receiving the authorization token and third biometric data from the second computing device. If the data is not recent, the primary computing system can transmit a message to the third computing system indicating that the data is not recent, and not continue to step 330.

At step 330, the method 300 can include generating a metric corresponding to similarity between the second biometric data and the third biometric data in response to verifying the second request. To verify that the third biometric data corresponds to the second user, the primary computing system can compare the third biometric data to the second biometric data previously provided to the primary computing system. To do so, the primary computing system can calculate a score (e.g., the metric) that indicates a likelihood that the third biometric data corresponds to the second user. For example, by comparing images, video, or other biometric information in the third biometric data to the second biometric data, the primary computing device can detect the presence of one or more anomalies. The size and number of the detected anomalies can influence the score. For example, larger anomalies or a larger number of anomalies can indicate a larger score (and therefore a higher likelihood that the image is fraudulent). Voice data or other types of biometric data can also be applied to similar filters or anomaly detection models that are trained using machine-learning techniques to detect potentially fraudulent biometric data.

Anomaly detection models can be executed using the third and second biometric data as input and can generate the core indicating the likelihood that the biometric data matches (e.g., and therefore corresponds to the second user). The anomaly detection model can be trained using supervised learning, unsupervised learning, semi-supervised learning, or other machine-learning techniques to calculate the score. Some examples of machine learning models can include neural networks (e.g., a deep neural network (DNN), a convolutional neural network (CNN), a recurrent neural network (RNN) such as a long-short term memory (LSTM) model, combinations thereof, etc.), regression models (e.g., linear regression, sparse vector machine (SVM), logistic regression, polynomial regression, ridge regression, Lasso regression, Bayesian linear regression, etc.), or other types of classifiers (e.g., naïve Bayes, decision trees, k-nearest neighbor (KNN), extreme gradient boosting (XGBoost) models, etc.). The aforementioned machine-learning models may also be utilized for any type of machine-learning or artificial intelligence performed task described herein. In some implementations, multiple machine-learning models may be executed in a machine-learning pipeline to perform various operations described herein.

At step 335, the method 300 can include transmitting an indication that the grant of authorization to the second user is verified in response to determining that the metric exceeds a threshold. The indication can be transmitted, for example, to one or more of the first computing device, the second computing device, the third computing device, or a fourth computing device. For example, the first computing device of the first user can be notified that the second user has utilized the authorization token, and has therefore attempted to access one or more digital assets or secure network locations of, or is acting on behalf of, the first user. The second computing device can also be notified that the primary computing system has verified the authorization token and the third biometric data, for example, in one or more notifications, alerts, or other types of electronic messages. The third computing device (e.g., the secondary computing system 102) can receive an electronic message from the primary computing system indicating that the authorization token and the third biometric data are verified, which may cause the third computing device to execute one or more secondary applications (e.g., the secondary applications 116). The secondary applications may provide access to one or more digital assets or secure network locations of the first user. The access may be provided to the second user via the third computing device, or may be provided by the third computing device to the second computing device. In an embodiment, the indication may also be provided to a fourth computing device (e.g., another secondary computing system 102, another user device 103, etc.), which may be responsible for monitoring network security and the use of authorization tokens. In another embodiment, the primary computing system can transmit a second digital token that authorizes access to the digital assets or secure network locations of the first user to the second computing device of the second computing device.

Figure 4:
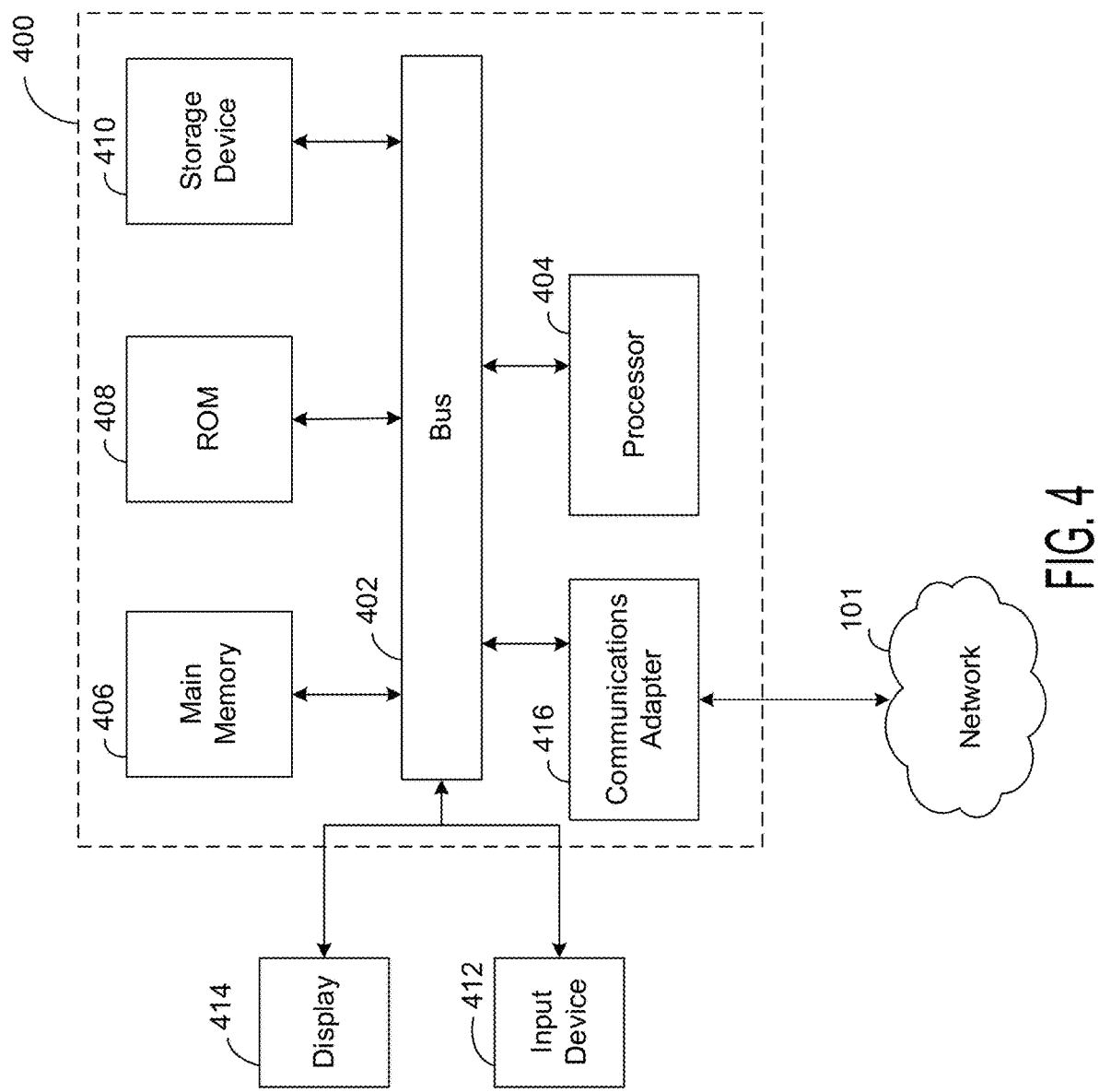
FIG. 4 is a component diagram of an example computing system suitable for use in the various arrangements described herein, in accordance with one or more example implementations.

FIG. 4 is a component diagram of an example computing system suitable for use in the various implementations described herein, according to an example implementation. For example, the computing system 400 may implement an example secondary computing system 102, user device 103, or primary computing system 104 of FIG. 1, or various other example systems and devices described in the present disclosure.

The computing system 400 includes a bus 402 or other communication component for communicating information and a processor 404 coupled to the bus 402 for processing information. The computing system 400 also includes main memory 406, such as a RAM or other dynamic storage device, coupled to the bus 402 for storing information, and instructions to be executed by the processor 404. Main memory 406 can also be used for storing position information, temporary variables, or other intermediate information during execution of instructions by the processor 404. The computing system 400 may further include a read only memory (ROM) 408 or other static storage device coupled to the bus 402 for storing static information and instructions for the processor 404. A storage device 410, such as a solid-state device, magnetic disk, or optical disk, is coupled to the bus 402 for persistently storing information and instructions.

The computing system 400 may be coupled via the bus 402 to a display 414, such as a liquid crystal display, or active matrix display, for displaying information to a user. An input device 412, such as a keyboard including alphanumeric and other keys, may be coupled to the bus 402 for communicating information, and command selections to the processor 404. In another implementation, the input device 412 has a touch screen display. The input device 412 can include any type of biometric sensor, or a cursor control, such as a mouse, a trackball, or cursor direction keys, for communicating direction information and command selections to the processor 404 and for controlling cursor movement on the display 414.

In some implementations, the computing system 400 may include a communications adapter 416, such as a networking adapter. Communications adapter 416 may be coupled to bus 402 and may be configured to enable communications with a computing or communications network 101 and/or other computing systems. In various illustrative implementations, any type of networking configuration may be achieved using communications adapter 416, such as wired (e.g., via Ethernet), wireless (e.g., via Wi-Fi, Bluetooth), satellite (e.g., via GPS) pre-configured, ad-hoc, LAN, WAN, and the like.

According to various implementations, the processes of the illustrative implementations that are described herein can be achieved by the computing system 400 in response to the processor 404 executing an implementation of instructions contained in main memory 406. Such instructions can be read into main memory 406 from another computer-readable medium, such as the storage device 410. Execution of the implementation of instructions contained in main memory 406 causes the computing system 400 to perform the illustrative processes described herein. One or more processors in a multi-processing implementation may also be employed to execute the instructions contained in main memory 406. In alternative implementations, hard-wired circuitry may be used in place of or in combination with software instructions to implement illustrative implementations. Thus, implementations are not limited to any specific combination of hardware circuitry and software.

Figure 5:
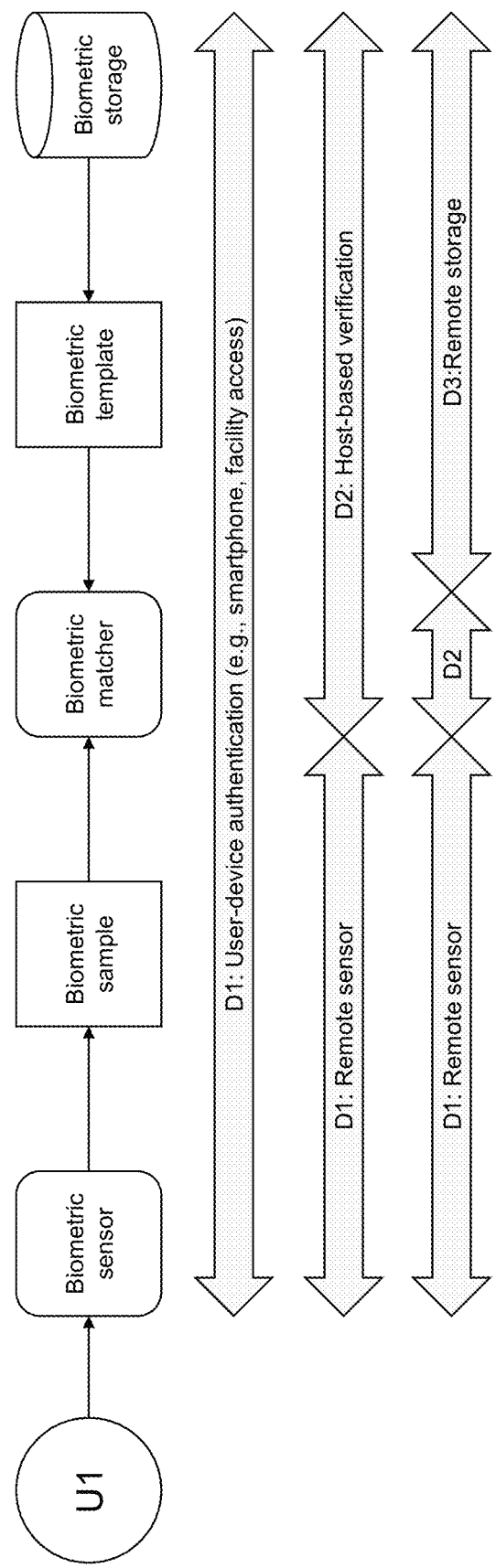
FIG. 5 provides an overview of biometrics and use of biometric data in verification processes according to various potential embodiments.

Referring to FIG. 5, User 1 (U1) may use a biometric sensor to provide a biometric sample, which may be provided to a biometric matcher. The matcher may use a biometric template from a biometric storage to determine whether the biometric sample sufficiently matches the biometric template. In various embodiments, this may occur on a single device (Device 1 or "D1"). In other embodiments, this process can involve multiple devices. For example, D1 may be a remote device with a sensor that is used to obtain, using a biometric sensor, a biometric sample of User 1 ("U1"). The biometric matcher, biometric template, and biometric storage may be part of a Device 2 ("D2") that provides host-based verification. In other embodiments, the matcher may be part of D2, and the biometric template may be stored in biometric storage by a separate Device 3 ("D3").

Figure 6:
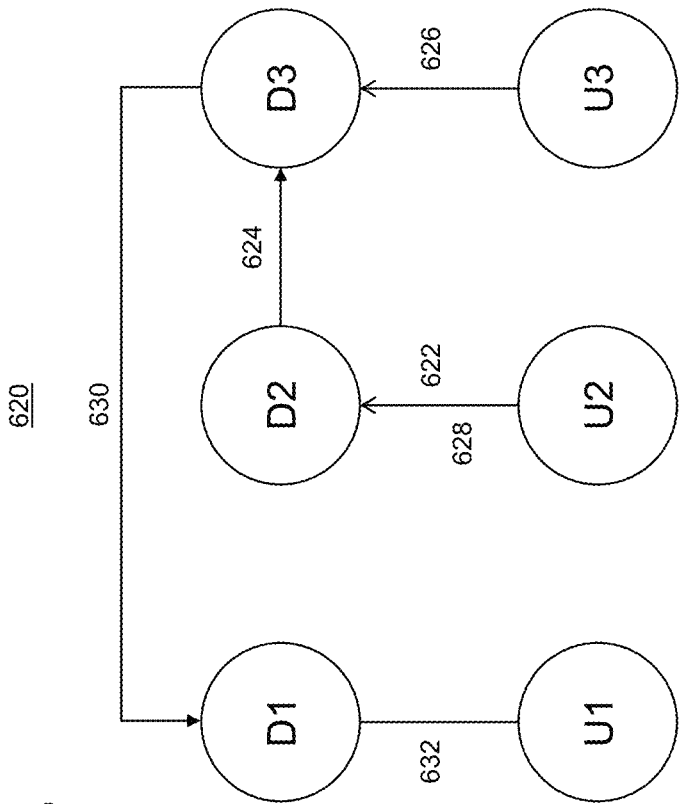
FIG. 6 provides example workflows for acquisition and use of biometric data in verification processes according to various potential embodiments.
Figure 6:
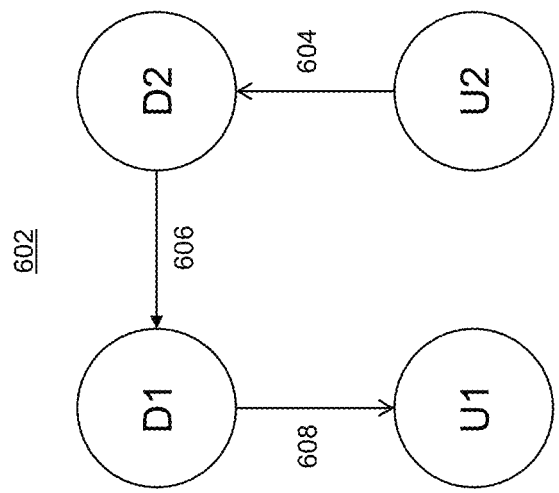

FIG. 6 provides example process flows 602 and 620, according to various potential embodiments. For example, in process flow 602, User 2 ("U2") may provide biometrics using D2 (604), and D2 may verify the biometrics and send an "OK" (e.g., pass for generating a score that is at least as great as a threshold) to D1 (606). D1 may then display, for U1, an "OK" or indication of verification (608). In process flow 620, U2 may request that User 3 ("U3") provide verification (622). D2 may then send a request to Device 3 ("D3") (624), and U3 may enter biometrics on D3 (626). U2 may send a notice of the request to U1 (628). D3 may verify the biometrics of U3 and send an "OK" to D1 (630). U1 may see the "OK" displayed on D1 (632).

Figure 7:
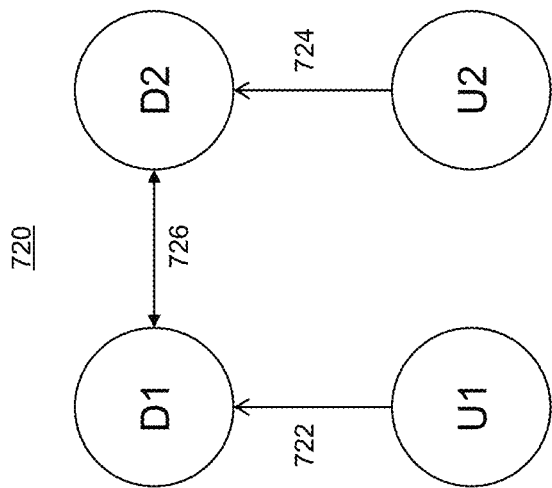
FIG. 7 provides example workflows for acquisition and use of biometric data in verification processes according to various potential embodiments.
Figure 7:
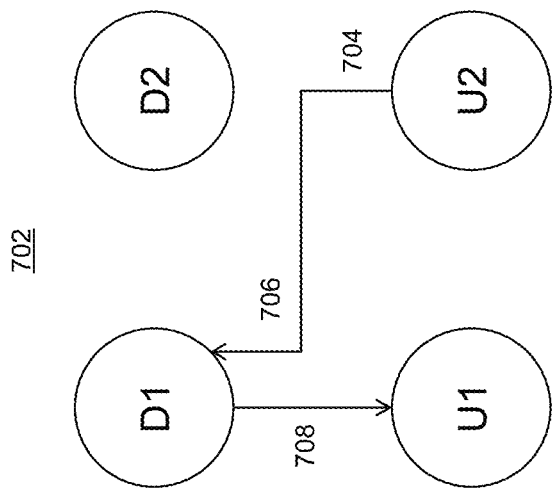

FIG. 7 provides example process flows 702 and 720, according to various potential embodiments. For example, in process flow 702, User 2 ("U2") may provide biometrics to D1 (704), and D1 may verify the biometrics (706), and U1 may see an "OK" displayed on D1 (708). In process flow 720, U1 may enroll biometrics on D1 (722), U2 may enroll biometric on D2 (724), and devices D1 and D2 may exchange biometric templates (726).

Figure 8:
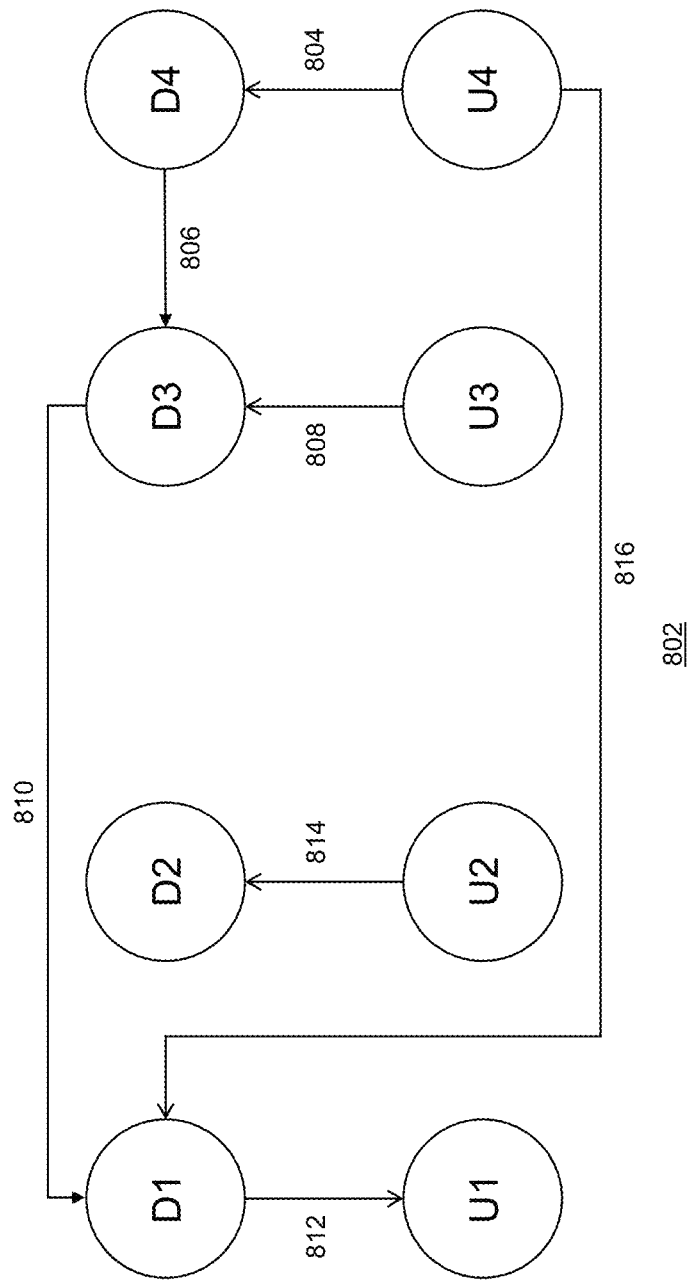
FIG. 8 provides an example workflow for acquisition and use of biometric data in verification processes according to various potential embodiments.

FIG. 8 provides an example process flow 802, according to various potential embodiments. User 4 ("U4") enters biometrics into Device 4 ("D4") (804), and D4 sends biometric template to D3 (806). U3 enters biometrics into D3 (808), and D3 sends U4 biometric template to D1. U1 enters biometrics into D1 (812) and U2 enters biometrics into D2 (814). U4 enters biometrics into D1 (816). In an example implementation, a mother may send a grandfather's biometric template to a school official to authorize the grandfather to pick up a child from preschool, with the child verifying identity using his or her own smartphone.

The implementations described herein have been described with reference to drawings. The drawings illustrate certain details of specific implementations that implement the systems, methods, and programs described herein. However, describing the implementations with drawings should not be construed as imposing on the disclosure any limitations that may be present in the drawings.

It should be understood that no claim element herein is to be construed under the provisions of 35 U.S.C. § 112 (f), unless the element is expressly recited using the phrase "means for."

As used herein, the term "circuit" may include hardware structured to execute the functions described herein. In some implementations, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some implementations, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some implementations, the one or more processors may be embodied in various ways. The one or more processors may be constructed in a manner sufficient to perform at least the operations described herein. In some implementations, the one or more processors may be shared by multiple circuits (e.g., circuit A and circuit B may comprise or otherwise share the same processor, which, in some example implementations, may execute instructions stored, or otherwise accessed, via different areas of memory). Alternatively or additionally, the one or more processors may be structured to perform or otherwise execute certain operations independent of one or more co-processors.

In other example implementations, two or more processors may be coupled via a bus to enable independent, parallel, pipelined, or multi-threaded instruction execution. Each processor may be implemented as one or more general-purpose processors, ASICs, FPGAs, digital signal processors (DSPs), or other suitable electronic data processing components structured to execute instructions provided by memory. The one or more processors may take the form of a single core processor, multi-core processor (e.g., a dual core processor, triple core processor, and/or quad core processor), microprocessor, etc. In some implementations, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the implementations might include general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some implementations, the non-volatile media may take the form of ROM, flash memory (e.g., flash memory such as NAND, 3D NAND, NOR, 3D NOR), EEPROM, MRAM, magnetic storage, hard discs, optical discs, etc. In other implementations, the volatile storage media may take the form of RAM, TRAM, ZRAM, etc. Combinations of the above are also included within the scope of machine-readable media. In this regard, machine-executable instructions comprise, for example, instructions and data, which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example implementations described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes, and omissions may be made in the design, operating conditions and implementation of the implementations without departing from the scope of the present disclosure as expressed in the appended claims.

What is claimed is:

1. A method comprising:
   receiving, by a computing system comprising one or more processors, from a first computing device of a first user, a first request to grant an authorization to a second user, the first request comprising first biometric data corresponding to the first user and second biometric data corresponding to the second user;
   generating, by the computing system, an authorization token based on the first request from the first computing device;
   transmitting, by the computing system, the authorization token to a second computing device of the second user;
   receiving, by the computing system, from a third computing device, a second request to authorize the second user, the second request comprising one or more data packages;
   verifying, by the computing system, the second request, wherein verifying the second request comprises analyzing the one or more data packages to (i) determine that the one or more data packages comprise the authorization token, third biometric data, and provenance data corresponding to the authorization token and the third biometric data, and (ii) based on the provenance data, verify that the authorization token and third biometric data were received by the third computing device from the second computing device within a predetermined time period;
   generating, by the computing system, in response to verifying the second request, a metric corresponding to similarity between the second biometric data and the third biometric data; and
   in response to determining that the metric exceeds a threshold, transmitting, by the computing system, an indication that the grant of authorization to the second user is verified to at least one of the first computing device, the second computing device, the third computing device, or a fourth computing device.

2. The method of claim 1, further comprising transmitting, by the computing system, at least one of the authorization token or a second digital token to a second computing device based on verification of the grant of authorization.

3. The method of claim 1, wherein at least one of the first biometric data or the second biometric data is based on a plurality of biometric scans.

4. The method of claim 2, wherein the plurality of biometric scans comprises scans of multiple different modalities.

5. The method of claim 4, wherein the multiple different modalities comprise a plurality of a facial scan, a fingerprint scan, and a voice sample.

6. The method of claim 1, wherein the provenance data identifies source of the authorization token and the third biometric data, and device used to obtain the authorization token and the third biometric data.

7. The method of claim 1, wherein the first request further comprises second provenance data corresponding to at least one of the first biometric data or the second biometric data, the second provenance data comprising a plurality of (i) timing of biometric scans, (ii) scanners used to capture the biometric scans, and (iii) number or type of errors or failed attempts corresponding to biometric scans.

8. The method of claim 1, wherein the first request further comprises one or more media files include one or more audio files, video files, or images captured using at least one of the first computing device or the second computing device.

9. The method of claim 8, wherein the one or more media files comprises at least one of an audio file or a video file of the first user speaking a phrase or performing an action.

10. The method of claim 9, further comprising analyzing the audio file or the video file to verify the phrase based on a script corresponding to the authorization to be granted.

11. The method of claim 9, further comprising verifying sounds in the audio file or the video file based on a voice signature in a first digital identity profile of the first user.

12. The method of claim 1, further comprising verifying at least one of the first biometric data and the second biometric data based on biometric data in at least one of a first digital identity profile of the first user and a second digital identity profile of the second user.

13. The method of claim 12, wherein at least one of the first digital identity profile or the second digital identity profile is maintained by the computing system.

14. The method of claim 12, wherein the computing system is a first computing system, and wherein at least one of the first digital identity profile or the second digital identity profile is maintained by a second computing system.

15. The method of claim 1, further comprising adding an identification of the first request to at least one of a first digital identity profile of the first user or a second digital identity profile of the second user.

16. The method of claim 1, further comprising adding the authorization token to at least one of a first digital identity profile of the first user or a second digital identity profile of the second user.

17. The method of claim 1, further comprising verifying the first computing device based on a first digital identity profile of the first user.

18. The method of claim 1, further comprising identifying the second computing device based on a second digital identity profile of the second user.

19. The method of claim 1, wherein the third computing device is associated with a third computing system granting the authorization to the second user.

20. A computing system comprising one or more processors configured to:
   receive, from a first computing device of a first user, a first request to grant an authorization to a second user, the first request comprising first biometric data corresponding to the first user and second biometric data corresponding to the second user;
   generate an authorization token based on the first request from the first computing device;
   transmit the authorization token to a second computing device of the second user;
   receive, from a third computing device, a second request to authorize the second user, the second request comprising one or more data packages;
   verify the second request, wherein verifying the second request comprises analyzing the one or more data packages to (i) determine that the one or more data packages comprise the authorization token, third biometric data, and provenance data corresponding to the authorization token and the third biometric data, and (ii) based on the provenance data, verify that the authorization token and third biometric data were received by the third computing device from the second computing device within a predetermined time period;
   generate, in response to verifying the second request, a metric corresponding to similarity between the second biometric data and the third biometric data; and
   in response to determining that the metric exceeds a threshold, transmit an indication that the grant of authorization to the second user is verified to at least one of the first computing device, the second computing device, the third computing device, or a fourth computing device.

* * * * *